(12) United States Patent
Obando Chacon et al.

(10) Patent No.: US 12,045,589 B2
(45) Date of Patent: Jul. 23, 2024

(54) SOFTWARE DEVELOPMENT IMPROVEMENT STAGE OPTIMIZATION

(71) Applicant: Microsoft Technology Licensing, LLC, Redmond, WA (US)

(72) Inventors: German David Obando Chacon, Kirkland, WA (US); Mark Alistair Wilson-Thomas, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 190 days.

(21) Appl. No.: 17/825,257

(22) Filed: May 26, 2022

(65) Prior Publication Data

US 2023/0385042 A1 Nov. 30, 2023

(51) Int. Cl.
*G06F 8/41* (2018.01)
*G06F 11/36* (2006.01)
*G06F 18/214* (2023.01)

(52) U.S. Cl.
CPC .............. *G06F 8/443* (2013.01); *G06F 8/433* (2013.01); *G06F 8/447* (2013.01); *G06F 18/214* (2023.01); *G06F 11/3664* (2013.01)

(58) Field of Classification Search
CPC ......... G06F 8/65; G06F 11/3664; G06F 20/00
See application file for complete search history.

(56) References Cited

U.S. PATENT DOCUMENTS

| | | | |
|---|---|---|---|
| 10,817,604 B1* | 10/2020 | Kimball | G06F 21/563 |
| 2005/0268288 A1* | 12/2005 | Nattinger | G06F 8/34 717/125 |
| 2020/0110693 A1* | 4/2020 | Herrin | G06F 8/355 |
| 2021/0149788 A1 | 5/2021 | Downie et al. | |
| 2022/0019496 A1* | 1/2022 | Lozano | G06N 20/20 |

(Continued)

OTHER PUBLICATIONS

"Artificial Intelligence: Poirot", retrieved from «http://binamp.com/artificial-intelligence-poirot/», Copyright @ 2019, 8 pages.

(Continued)

*Primary Examiner* — Ziaul A Chowdhury
(74) *Attorney, Agent, or Firm* — Ogilvie Law Firm

(57) ABSTRACT

Some embodiments automatically detect a software development code improvement stage. Improvement stage detection may be based on computational events involving a development tool, such as a testing tool, a debugger, or a performance profiler. Program analysis tools driven by artificial intelligence functionality may then be automatically invoked to provide code improvement options, which may be presented to a developer in a tool user interface. Options may include source code edits, configuration changes, or test coverage changes, for example. Analysis results and corresponding code improvement options are thus presented when the developer is prioritizing program performance, program behavior accuracy, program security, or programming style, as opposed to prioritizing code creation or code integration. Programs under development, as well as quality reviews of such programs, may accordingly be optimized by performing performance and security analysis, testing, and coding style analysis during the code improvement stage.

20 Claims, 5 Drawing Sheets

---

ENHANCED SYSTEM 102, 202 WITH IMPROVEMENT STAGE OPTIMIZATION FUNCTIONALITY 208

MEMORY/MEDIA 112, 114

IMPROVEMENT STAGE OPTIMIZATION SOFTWARE 302 TO DETECT CODE IMPROVEMENT STAGE, PRESENT AI-BASED SUGGESTIONS TO DEVELOPER, AND IMPLEMENT DEVELOPER'S RESPONSE

ANALYSIS 304 RESULT 306 | DEVELOPMENT 308 TOOL(S) 310 | IMPROVEMENT STAGE DETECTION MACHINE LEARNING MODEL 312

PROCESSOR 110 | SOURCE CODE 314 | INTERFACE(S) 316

(56) References Cited

U.S. PATENT DOCUMENTS

| | | | | |
|---|---|---|---|---|
| 2022/0326917 A1* | 10/2022 | Chintala | .................. | G06F 8/38 |
| 2023/0229413 A1* | 7/2023 | Basu | ........................ | G06F 8/71 |
| | | | | 717/168 |

OTHER PUBLICATIONS

"About GitHub Advanced Security", retrieved from «https://docs.github.com/en/get-started/learning-about-github/about-github-advanced-security», no later than May 15, 2022, 1 page.

Jose Grimaldo, "Announcing the limited preview of Optimization Insights", retrieved from «https://techcommunity.microsoft.com/t5/azure-observability-blog/announcing-the-limited-preview-of-optimization-insights/ba-p/3254582«, Mar. 11, 2022, 5 pages.

Bartek Skwira, "Python auto-generated documentation—3 tools that will help document your project", retrieved from «https://medium.com/blueriders/python-autogenerated-documentation-3-tools-that-will-help-document-your-project-c6d7623814ef«, Jul. 17, 2020, 30 pages.

"Machine learning", retrieved from «https://en.wikipedia.org/wiki/Machine_learning», May 13, 2022, 30 pages.

"Anti-pattern", retrieved from «https://en.wikipedia.org/wiki/Anti-pattern», Apr. 6, 2022, 4 pages.

"Vulnerability (computing)", retrieved from «https://en.wikipedia.org/wiki/Vulnerability_(computing)», May 8, 2022, 11 pages.

"Software development", retrieved from «https://en.wikipedia.org/wiki/Software_development», Mar. 28, 2022, 8 pages.

"Code coverage", retrieved from «https://en.wikipedia.org/wiki/Code_coverage», Apr. 27, 2022, 7 pages.

"Code refactoring", retrieved from «https://en.wikipedia.org/wiki/Code_refactoring», May 4, 2022, 8 pages.

"Software development process", retrieved from «https://en.wikipedia.org/wiki/Software_development_process», May 10, 2022, 10 pages.

"Software testing", retrieved from «https://en.wikipedia.org/wiki/Software_testing«, May 15, 2022, 29 pages.

Astha Oriel, "8 AI-Enabled Software Development Tools for Faster Business Processes", retrieved from «https://www.analyticsinsight.net/8-ai-enabled-software-development-tools-for-faster-business-processes/», Nov. 27, 2020, 4 pages.

Simon Bisson, "AI gives software development tools a boost", retrieved from «https://www.infoworld.com/article/3623773/ai-gives-software-development-tools-a-boost.html», Jul. 7, 2021, 6 pages.

Gourav Sharma, "How Artificial Intelligence and Machine Learning are Revolutionizing Software Development", retrieved from «https://www.computer.org/publications/tech-news/trends/ai-is-changing-software-development», Oct. 30, 2021, 11 pages.

Leelahapant, Pabhanin, "Predictive Regression Test Selection Technique by Means of Formal Concept Analysis", In Thesis of Department of Computer Science and Software Engineering, no later than Mar. 31, 2006, 133 Pages.

"International Search Report and Written Opinion Issued in PCT Application No. PCT/US23/017234", Mailed Date: Jul. 18, 2023, 12 Pages.

\* cited by examiner

SOFTWARE DEVELOPMENT IMPROVEMENT STAGE OPTIMIZATION

BACKGROUND

Noon Many modern devices in a broad range of fields have some form of computing power, and operate according to software instructions that execute using that computing power. A few of the many examples of devices whose behavior depends on software include cars, planes, ships and other vehicles, robotic manufacturing tools and other industrial systems, medical devices, cameras, inventory management and other retail or wholesale systems, smartphones, tablets, servers, workstations and other devices which connect to the Internet.

The firmware, operating systems, applications and other software programs which guide various behaviors of these and many other computing devices is developed by people who may be known as developers, programmers, engineers, or coders, for example, but are referred to collectively here as "developers". Developers may use source code editors, compilers, debuggers, profilers and various other software development tools as they develop software. The course of a given software program's development may be described as the program's lifecycle. The lifecycle may begin with an idea or a desire for some particular device behavior or device capability, and may end when a software program that provides the desired behavior or capability, or provides some related functionality, is no longer in use. Between the beginning and the end, one or more developers will (or did) face technical challenges which arise in software development. Although many advances have been made, improvements in software development technologies are still possible.

SUMMARY

Some embodiments described herein address technical challenges related to software development, such as how to most effectively employ artificial intelligence (AI) functionalities, how to recognize developer intentions, and how to promote efficient development efforts. In particular, some embodiments promote efficient software development by automatically recognizing a developer's intention to improve existing code and then offering the developer one or more AI-based analyses of the code. Code improvements based on the analyses are then at least suggested, and may be both suggested and made.

Some embodiments are configured to facilitate source code development in an improvement stage code optimization which begins by an embodiment detecting a code improvement stage during a software development activity. The code improvement stage may be preceded by a code creation stage. In response to detecting the code improvement stage, the embodiment presents one or more code improvement options via a tool user interface. The code improvement options are based on artificial intelligence functionalities which perform program code analyses. After obtaining one or more responses to presentation of the code improvement options, the embodiment implements the responses, e.g., by making or suggesting changes to program source code, program testing coverage, or other aspects of a program's performance, accuracy, security, or style.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Innovations may expand beyond their origins, but understanding an innovation's origins can help one more fully appreciate the innovation. In the present case, some teachings described herein were motivated by technical challenges arising from ongoing efforts by Microsoft innovators to help software developers who work in structured development teams on large software projects. However, the teachings presented here may also be applied beneficially to other developers, such as those who work on smaller projects, and those who work largely or entirely outside a formal team structure.

Microsoft innovators explored various ways to effectively employ artificial intelligence (AI) functionalities to assist software development. The innovators recognized that many AI-based functionalities exist, and that others may well be developed. The innovators determined that although focusing on particular AI-based functionalities can often be helpful, attention may also be beneficially directed at the timing and manner of presentation of AI-based functionalities during software development. The innovators concluded that offering AI-based assistance to a developer at a bad time, or in a bad way, can be ineffective, or even be counterproductive.

The innovators recognized that many views exist about how software development progresses over time, including views which discuss some kind of software lifecycle. These views are not mutually consistent. For example, different definitions of software lifecycle may posit different stages in that lifecycle, different numbers of stages, and even different goals for stages that have the same or similar names as one another.

Figure 11:
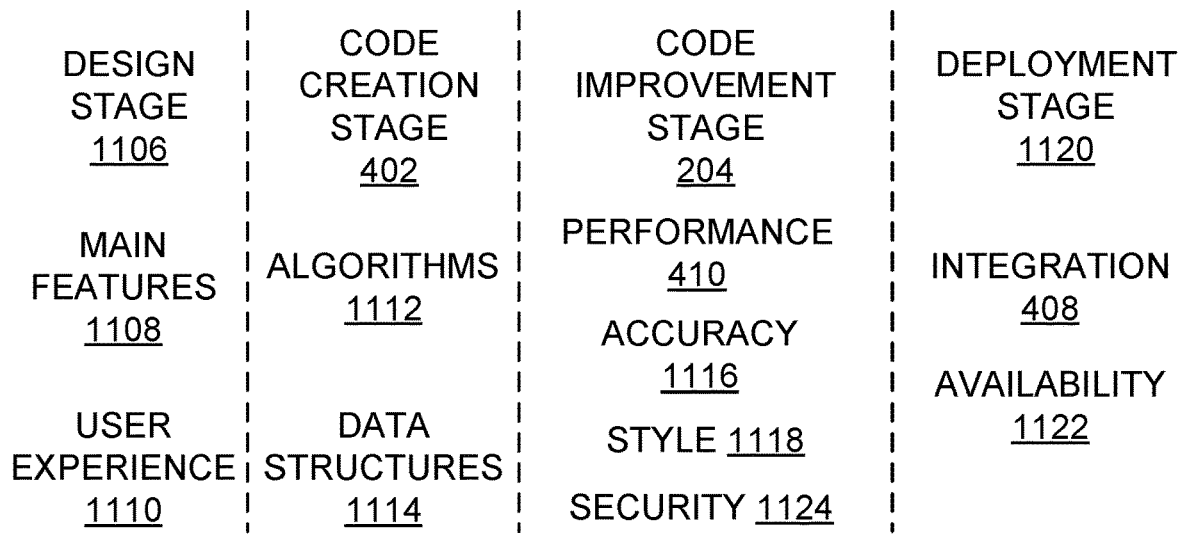
FIG. 11 is a lifecycle segment diagram illustrating some stages in a software development lifecycle.

In the view of the innovators, software development often includes a lifecycle stage which they call the "code improvement stage". FIG. 11 shows one way to place this code improvement stage in context. A lifecycle segment 1100 having four stages 1104 is shown, along with some of a developer's main priorities 1102 at each stage. This is not the only lifecycle segment 1100 suitable for placing the code improvement stage 204 in a lifecycle, but it is one possibility.

During a design stage 1106, the main features 1108 and the user experience 1110 of a program are designed. For instance, a design for a camera application 122 might specify that the application can run on a smartphone or a tablet with a graphical user interface that allows a user to remotely activate a camera by wireless communication and also allows the user to download pictures from the camera to the smartphone or tablet. This is merely one example application, from a universe of many possible application programs. During the design stage 1106, a developer's priorities focus on specifying the program's features 1108 and user experience 1110, without regard to any particular programming language, data structure, programming style, source code version control tool, and so on.

During a code creation stage 403, the developer writes code 130 in one or more programming languages. The code 130 includes algorithms 1112 and data structures 1114 that are meant to provide the desired features 1108 and user experience 1110. For example, the camera application code could include a data structure that represents a given camera's make, model, and supported picture formats, and code that performs a wireless communications algorithm. During the code creation stage 403, the developer's priorities focus on getting code written that provides most or all of the program's features 1108 and user experience 1110. Explicitly or implicitly, the developer understands and accepts that at this stage the code may have errors, may be inefficient, and may not be easy for other developers to read and understand.

During the code improvement stage 204, the developer tries to improve aspects of the code, such as the performance 410, accuracy 1116, security 1124, or style 1118 of the code 130. This improvement stage 204 may also be referred to as a testing time or a debug time, or as a period when the developer is in a test mode or a debug mode, or in a testing mindset or a debug mindset.

For example, during an instance of improvement stage 204 the developer may try to improve camera application code performance 410 so that pictures are transferred faster from the camera to the smartphone or tablet; the developer may test a variety of different smartphones and tablets for accurate 1116 execution of the desired user experience and check for security 1124 gaps; and the developer may try to clean up the program's source code style 1118 so that the code 314 uses white space more consistently and is better documented internally by comments. In short, during the code improvement stage 204 the developer's priorities focus on making the existing code better in various ways, as opposed to making design changes or writing more code from scratch.

During a deployment stage 1120, the code is integrated 408 and made available 1122, e.g., as a release 416. If the code is part of a larger project, it may be integrated 408 into that project. For example, the camera application could be integrated into a photo and video editing suite. The code is made available when it can be executed by more users 104, as opposed to only the developer or the developer's team 420. During a deployment stage 1120, the developer's priorities focus on how well the code interoperates with other parts of the larger project, and on feedback from users who have been given access to the code.

One of skill would acknowledge that progression through a software development lifecycle is not always as simple and linear as presented in this discussion of FIG. 11. For instance, if a program's design is changed to add a new feature 1108 or a different user experience 1110, then the development has returned to the design stage 1106, and will subsequently revisit the code creation stage 403. That newly created code could then be a target of improvement efforts during a revisited improvement stage 204. Deployment 1120 might have been postponed while the new code was designed, written, and tested, or alternately the new feature 1108 or the different user experience 1110 could be driven by feedback that was received after deployment of an earlier version of the program. More generally, a developer may re-enter code improvement stage for any of a wide variety of reasons.

Informed by this discussion of FIG. 11, and by other teachings herein, one of skill would acknowledge that development tools which offer suggestions to improve the performance, accuracy, security, or style of code, for example, are likely to be most effective if those suggestions are offered during the code improvement stage 204. At any other stage 1104, such offers may be perceived as irrelevant or intrusive, and may even be counterproductive.

For instance, a developer who is writing code 130 to execute an algorithm or define a data structure may be distracted by an automatic offer to assess the compliance of that code with some programming style guide, or by an automatic suggestion to refactor the code, or by an automatic warning that no unit test is associated yet with that code. Such distractions hamper code creation. Attempting to avoid distraction by making automatic code changes proactively and silently without developer approval would be even worse tool behavior. Even if the automated changes did improve testing coverage or program style or security, those changes may well conflict with the algorithms or data structures the developer intended to use. Thus, in addition to the distraction the changes cause when discovered, the developer would face the unwanted effort of undoing such proactive changes before proceeding to create the intended code.

An alternative view would make the code improvement suggestion mechanisms available only on user demand, e.g., via a menu selection, without proactively surfacing them during the code improvement stage. This approach has the disadvantage of putting a burden on the developer to know which code improvement suggestion mechanisms are available, and the disadvantage of requiring that the developer actively seek out the suggestion mechanisms by navigating the menu structure and then invoking them.

In short, a code improvement stage is the most efficient and effective time for a development tool to offer help with code performance, code accuracy, code security, or coding style. But leveraging this insight poses technical challenges, such as: how to automatically detect entry into the code improvement stage 204, how to automatically detect exit from the code improvement stage 204, and which code improvement functionalities to invoke during the code improvement stage 204.

Some embodiments described herein address these challenges. For example, some embodiments detect entry 1028 into the code improvement stage 204 based on events 732 involving testing, debugging, or performance profiling. Some embodiments detect exit 1030 from the code improvement stage 204 based on events 732 involving source code version control tools or source code review activity. Such detection 802 of improvement stage 204 entry and exit beneficially avoids distracting developers with improvement options 212 when they have different priorities because they are in a different stage of software development. Some embodiments invoke particular AI-based functionalities 210 during the code improvement stage 204. This beneficially provides developers with convenient and effective ways to improve code performance, accuracy, security, or style. These and other benefits will be apparent to one of skill from the teachings provided herein.

Operating Environments

Figure 1:
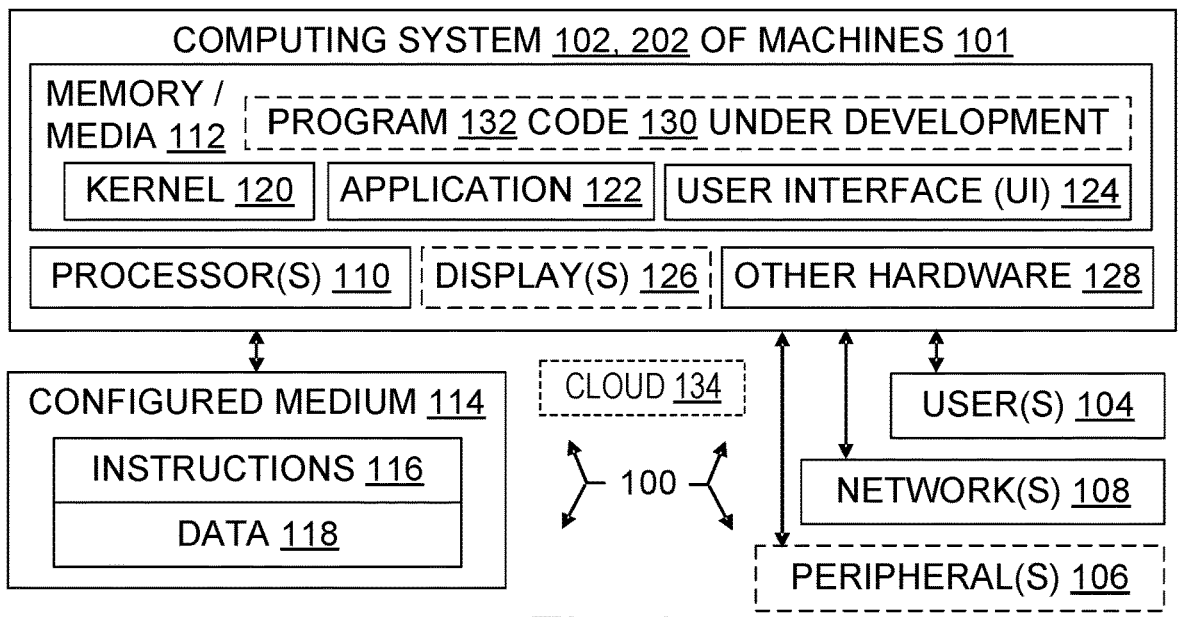
FIG. 1 is a diagram illustrating aspects of computer systems and also illustrating configured storage media.

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 134. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with a computer system 102 user interface 124 by using displays 126, keyboards 106, and other peripherals 106, via typed text, touch, voice, movement, computer vision, gestures, and/or other forms of I/O. Virtual reality or augmented reality or both functionalities may be provided by a system 102. A screen 126 may be a removable peripheral 106 or may be an integral part of the system 102. The user interface 124 may support interaction between an embodiment and one or more human users. The user interface 124 may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of human user 104. Automated agents, scripts, playback software, devices, and the like running or otherwise serving on behalf of one or more humans may also have accounts, e.g., service accounts. Sometimes an account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a cloud 134 and/or other network 108 via network interface equipment, for example.

Each computer system 102 includes at least one processor 110. The computer system 102, like other suitable systems, also includes one or more computer-readable storage media 112, also referred to as computer-readable storage devices 112. Applications 122 may include software apps on mobile devices 102 or workstations 102 or servers 102, as well as APIs, browsers, or webpages and the corresponding software for protocols such as HTTPS, for example.

Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs, GPUs, and/or quantum processors), memory/storage media 112, peripherals 106, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, improvement stage optimization functionality could be installed on an air gapped network and then be updated periodically or on occasion using removable media 114. A given embodiment may also communicate technical data and/or technical instructions through direct memory access, removable or non-removable volatile or nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More about Systems

Figure 2:
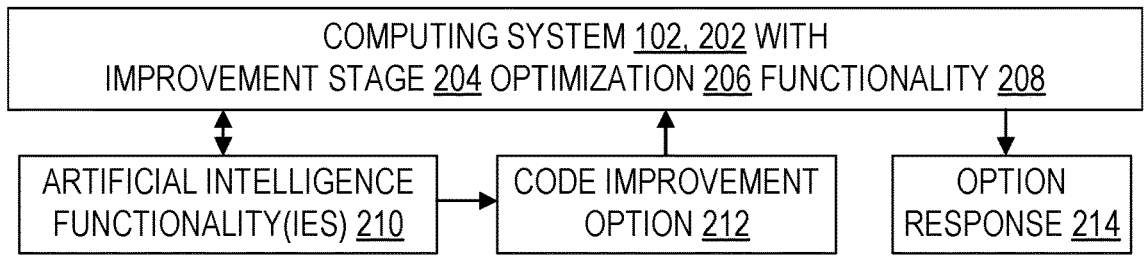
FIG. 2 is a diagram illustrating aspects of a computing system which has one or more of the software development improvement stage optimization enhancements taught herein.

FIG. 2 illustrates a computing system 102 configured by one or more of the improvement stage optimization enhancements taught herein, resulting in an enhanced system 202. This enhanced system 202 may include a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
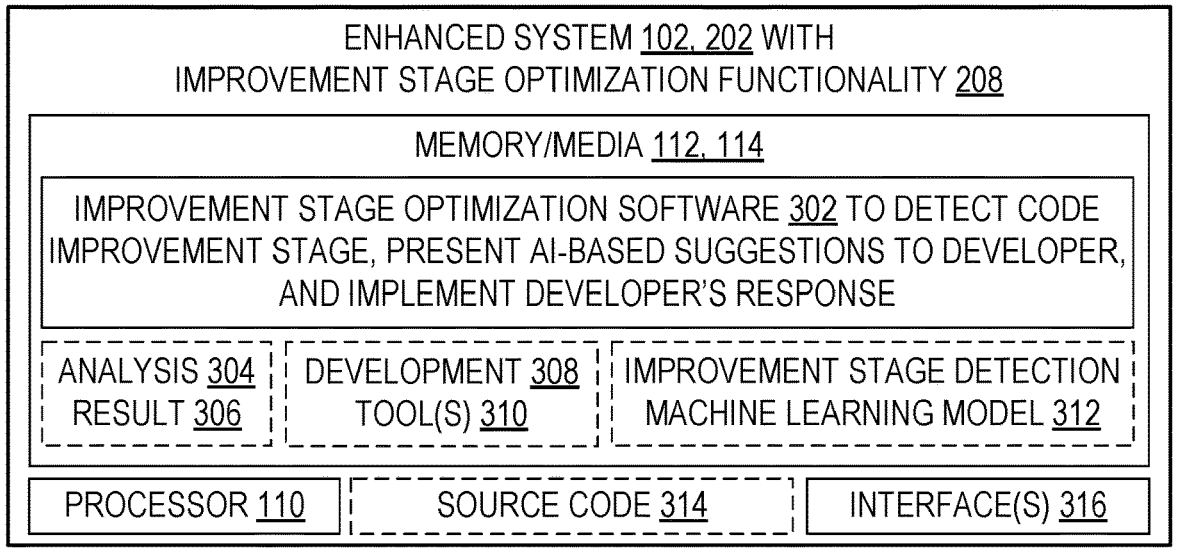
FIG. 3 is a block diagram illustrating an enhanced system configured with improvement stage optimization functionality.

FIG. 3 illustrates an enhanced system 202 which is configured with improvement stage optimization software 302 to provide functionality 208. Software 302 and other FIG. 3 items are discussed at various points herein, and additional details regarding them are provided in the discussion of a List of Reference Numerals later in this disclosure document.

Figure 4:
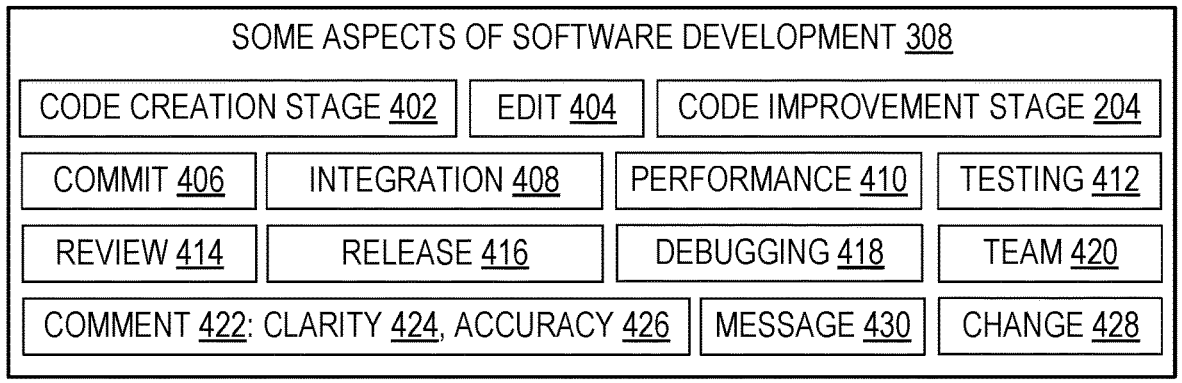
FIG. 4 is a block diagram illustrating some aspects of software development.

FIGS. 4 and 11 show some aspects of software development 308. This is not a comprehensive summary of all approaches to software development 308, or a comprehensive summary of all aspects of an environment 100 or system 202 or other context of software development 308 tools 310, or a comprehensive summary of all software development 308 event 732 data 118 or other data structures or code improvement functionalities or other mechanisms for potential use in or with a system 102 or 202. FIG. 4 items and FIG. 11 items are discussed at various points herein, and additional details regarding them are provided in the discussion of a List of Reference Numerals later in this disclosure document.

Figure 5:
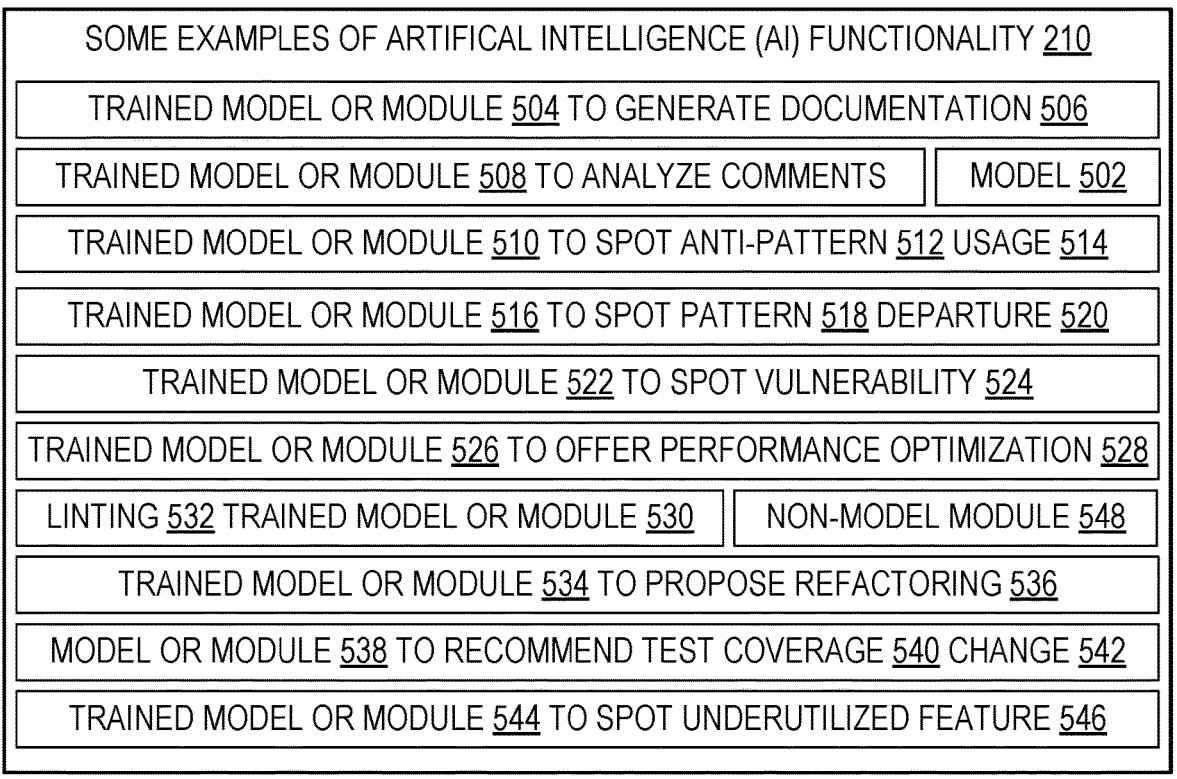
FIG. 5 is a block diagram illustrating some examples of artificial intelligence functionality for software development.

FIG. 5 shows aspects of some AI-based code improvement functionalities 210. This is not a comprehensive list of all aspects of these functionalities 210 or of artificial intelligence functionalities generally or of code improvement functionalities generally. FIG. 5 items are discussed at various points herein, and additional details regarding them are provided in the discussion of a List of Reference Numerals later in this disclosure document.

Figure 6:
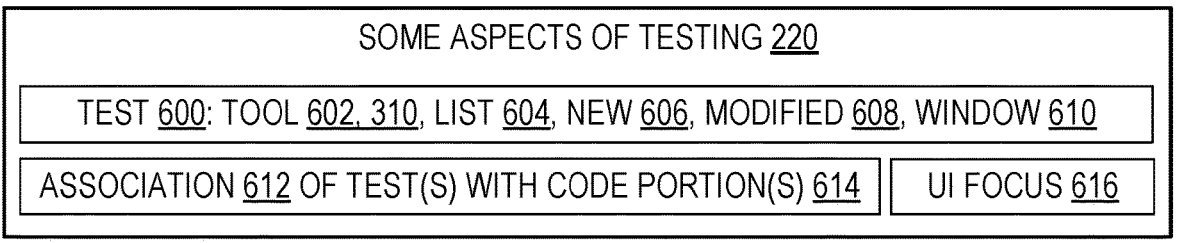
FIG. 6 is a block diagram illustrating some aspects of software testing during software development.

FIG. 6 shows some aspects of testing 220 as a part of software development 308. This is not a comprehensive list of all aspects of testing. FIG. 6 items are discussed at various points herein, and additional details regarding them are provided in the discussion of a List of Reference Numerals later in this disclosure document.

Figure 7:
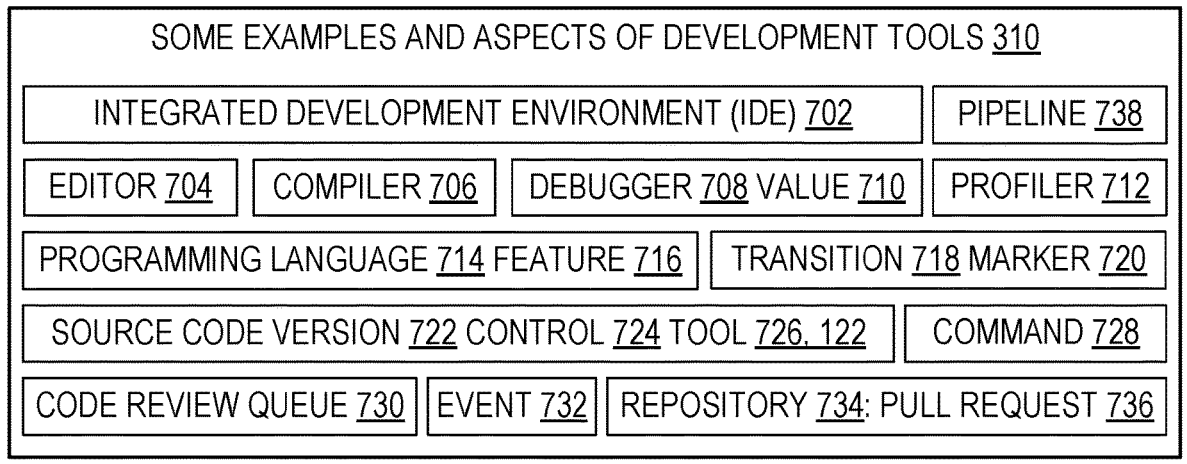
FIG. 7 is a block diagram illustrating some examples and some aspects of software development tools.

FIG. 7 shows some aspects and examples of some software development tools 310. This is not a comprehensive list of all tools generally, or of all programs generally, or of all software development tools. FIG. 7 items are discussed at various points herein, and additional details regarding them are provided in the discussion of a List of Reference Numerals later in this disclosure document.

In some embodiments, the enhanced system 202 may be networked through an interface 316. An interface 316 may include hardware such as network interface cards, software such as network stacks, APIs, or sockets, combination items such as network connections, or a combination thereof.

In some embodiments, an enhanced system 202 includes a computing system 202 which is configured to facilitate source code development. The enhanced system 202 includes a digital memory 112 and a processor 110 in operable communication with the memory. In a given embodiment, the digital memory 112 may be volatile or nonvolatile or a mix. The enhanced system 202 also includes a software development tool 310 having a user interface 124. The enhanced system 202 also includes a processor 110 in operable communication with the digital memory 112. The processor is configured to perform improvement stage code optimization 206 including: (a) detecting 802 a code improvement stage 204 during a software development activity 308 which is directed at a particular program code 130, in which the code improvement stage may be preceded by a code creation stage 402, (b) in response to detecting 802 the code improvement stage 204, presenting 812 a code improvement option 212 via the user interface 124, the code improvement option 212 based on an artificial intelligence functionality 210 which is configured to perform program code analysis 806, (c) obtaining 814 a response 214 to the presenting 812 of the code improvement option 212, and (d) implementing 816 the response 214.

In some embodiments or configurations, improvement options 212 are always presented to the developer, as opposed to a system 202 proactively making changes 428 without asking the developer first. In other embodiments or configurations, some changes 428 may be made proactively based on a general consent, e.g., as an effect of a previously selected tool setting or an environment variable or a default tool setting. For example, automatic error correction and other forms of linting 532, comment analysis functionality 508, and documentation generation functionality 504 could be enabled with any changes approved in advance by default.

In some embodiments or configurations, implementing 816 the response may include either not invoking a particular AI-based functionality 210 if the developer's response 214 was "no", or else invoking a particular AI-based functionality 210 if the developer's response 214 was "yes". Implementing 816 a "yes" could also include making a change 428 suggested 812 by the AI-based functionality 210, and possibly also generating 944 a non-AI test 600 to avoid regressing 948 that change.

Some embodiments invoke 804 one or more separate AI-based functionalities 210, whereas other embodiments include one or more AI-based functionalities 210. For example, a separation may be made between a particular AI-based functionality 210 and a system 202 based on licensing restrictions. Regardless of whether a given system 202 both includes and invokes a particular AI-based functionality 210, or merely invokes that AI-based functionality 210, examples of several AI-based functionalities 210 are now provided.

Artificial intelligence functionalities 210 suitable for use according to the teachings provided herein include various kinds of trained machine learning (ML) models 502, such as coding pattern detection modules 510 or 516, a refactoring module 534, a testing coverage module 538, and a language feature 716 utilization module 544. In particular, some of the suitable artificial intelligence functionalities 210 include examples listed below.

A trained machine learning model 504, 502 or AI-based module 504 which is configured to perform program source code analysis 806 and automatically generate 902 documentation 506 which describes a code 130 behavior.

A trained machine learning model 508, 502 or AI-based module 508 which is configured to perform program source code comment 422 analysis 806, 904 as to comment clarity 424 or comment accuracy 426 or both.

A coding pattern detection module 510 or trained machine learning model 510, 502 which is configured to perform program source code analysis 806 and automatically ascertain 906 usage 514 of a coding anti-pattern 512.

A coding pattern detection module 516 or trained machine learning model 516, 502 which is configured to perform program source code analysis 806 and automatically ascertain 908 departure 520 from a specified coding pattern 518. This departure 520, 306 may be presented, e.g., with a message 430 along the lines of "this code looks different than how your team usually writes this kind of call" or "it looks like you may have missed this spot while refactoring".

A trained machine learning model 522, 502 or AI-based module 522 which is configured to perform program source code analysis 806 and automatically identify 910 a security vulnerability.

A trained machine learning model 526, 502 or AI-based module 522 which is configured to perform program source code analysis 806 and automatically proffer 912 a performance optimization 528.

A trained machine learning model 530, 502 or AI-based module 530 which is configured to perform program source code linting analysis 532 to detect programming errors, bugs, stylistic errors, or suspicious constructs. Some compilers 706 perform an analysis also referred to as "linting", but the ML or other AI-based linting 532 may be distinguished in that it is performed by a trained machine learning model, not by techniques such as non-ML static analysis based on data flow analysis, regular expression pattern matching, or other mechanisms that do not require ML model training 932.

A refactoring module 534 or trained machine learning model 534, 502 which is configured to perform program source code analysis 806 and automatically propose 914 a code refactoring 536.

A testing coverage module 538 or trained machine learning model 538, 502 which is configured to perform testing coverage analysis 916 and automatically recommend 918 a change 542 in testing coverage 540. For instance, the module 538 may identify what code 130 is not covered by current tests 600. In some embodiments or configurations, the module 538 may also generate 1032 tests automatically for better coverage.

A language feature utilization module 544 or trained machine learning model 544, 502 which is configured to perform program source code analysis 806 and automatically point out 920 programming language features 546 which were not utilized or otherwise underutilized. This analysis result 306 may be presented, e.g., with a message 430 along the lines of "this code is not fully utilizing certain features that are defined in the latest standard for this programming language, so this code could be made more robust."

Reference numeral 502 above refers to trained machined learning models in functionality 210. However, a given AI-based functionality 210 may also or instead utilize a non-model AI module 548. Such modules 548 include and utilize AI technology other than a trained machined learning model 502, such as a rule-based system, expert system, heuristic system, genetic algorithms, or decision tree AI technology. Some modules 548 include and utilize program synthesis or programming-by-example technology such as the Microsoft PROSE™ framework (mark of Microsoft Corporation). Mechanisms which include and utilize both a trained machined learning model 502 and non-model AI technology also qualify as modules 548 due to the presence of non-model AI technology.

In some embodiments, the system 202 is configured to detect the code improvement stage by at least one of the following: determining 1002 that a testing tool 602 has been started 1004; determining 1006 that a testing window 610 has received 1008 a user interface focus 616; determining 1010 that a list 604 of available tests 600 is being displayed 1012; determining 1014 that a new test 606 has been added 1016; determining 1018 that a test 608 has been modified 1020; determining 1022 that no tests 600 are associated 612 with the particular program code 130 and determining 1024 the particular program code 130 is being examined 1026 with a debugger 708 (a developer might use a debugger for testing before unit tests are written); determining 1022 that no tests are associated 612 with a portion of the particular program code 130 which is being examined 1026 with a debugger; (a developer might use a debugger for testing this part of the code before unit tests are written for this part of the code even if tests have been written for other parts of the code); discerning 926 that a variable 928 value 710 has been set 930 per a user input value 710 during debugging 418 (setting values from the debugger UI indicates a testing mindset); or recognizing 922 that a performance profiler 712 has been started 1004.

Application of AI technology in embodiments is not necessarily limited to the analysis of code 130 or the analysis of testing 412. Some embodiments utilize an ML model 312 to detect 802 the code improvement stage. That is, some embodiments include a machine learning model 312, 502 which is trained 932 to perform code improvement stage detection 802.

One suitable approach to training a model 312 is supervised training based on churn data 118 (e.g., number of changes made) about commits 406 to a repository 734 that led to a testing period 412. The testing period may be detected, e.g., as an event which represents running a unit test or any of steps 1002, 1006 for a testing window, 1010, 1014, or 1018, for example. Pull request 736 timestamps data may also or instead be used as training data 118, when such data follows a frequency distribution prior to code improvement stage entry 1028 and the frequency distribution follows a pattern recognizable by a suitably trained model 312, 502.

One of skill informed by the teachings of the present disclosure will acknowledge that embodiments may be selected and configured to provide various technical benefits. For example, presenting 812 AI-based code improvement options 212 as described herein reduces the burden on human code reviewers and results in more effective code reviews 414, by resolving issues that would otherwise consume code review time and effort.

A given code review 414 may be done by a reviewer alone, or by a reviewer together with the developer who wrote the code, for example. In either case, code review personnel such as senior developers are often in short supply, and they often face a backlog of code 130 awaiting their review. During a review of a program's code, the quality and commercial viability of the program may be enhanced most if the reviewers focus their attention on program capabilities and the user experience. Program quality suffers if review time and effort are instead spent dealing with issues such as missing or unclear comments 422, coding style 1118, coding patterns 512, 518, security vulnerabilities 524, refactoring 536, test coverage 540, or programming language features 546. In short, opportunities to improve a program's quality from an end user's perspective are missed when improvement options are not presented 812 in the manner and at the time taught herein.

These example scenarios are illustrative, not comprehensive. One of skill informed by the teachings herein will recognize that many other scenarios and many other variations are also taught. In particular, different embodiments or configurations may vary as to the number or precise workings of the AI-based functionalities 210, the particular events 732 relied on to detect improvement stage entry 1028 or exit 1030, the kind of program code 130 under development, or the particular development tools 310 which present 812 the improvement stage options 212, for example, and yet still be within the scope of the teachings presented in this disclosure.

Other system embodiments are also described herein, either directly or derivable as system versions of described processes or configured media, duly informed by the extensive discussion herein of computing hardware.

Although specific software development improvement stage optimization architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. For example, a given embodiment may include additional or different data structure implementations of options 212, responses 214, and events 732 (using linked lists, trees, objects, pointers, tables, arrays, records, etc.), as well as different technical features, aspects, security controls, mechanisms, decision criteria, expressions, hierarchies, operational sequences, environment or system characteristics, or other improvement stage optimization functionality 208 teachings noted herein, and may otherwise depart from the particular illustrative examples provided.

Processes (a.k.a. Methods)

Figure 8:
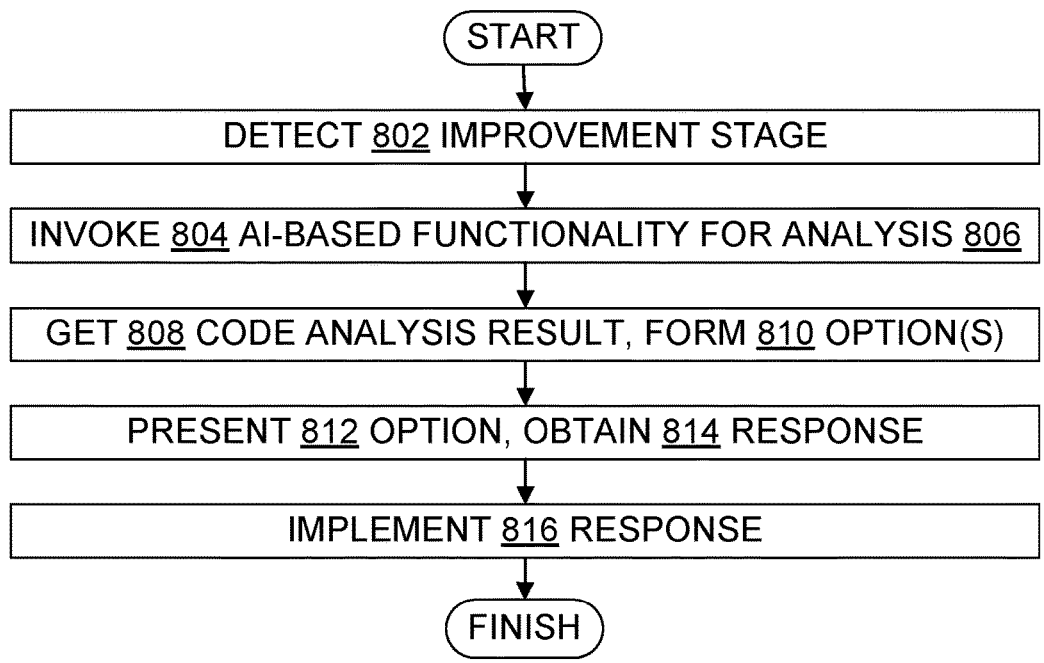
FIG. 8 is a flowchart illustrating steps in some methods for improvement stage optimization.
Figure 9:
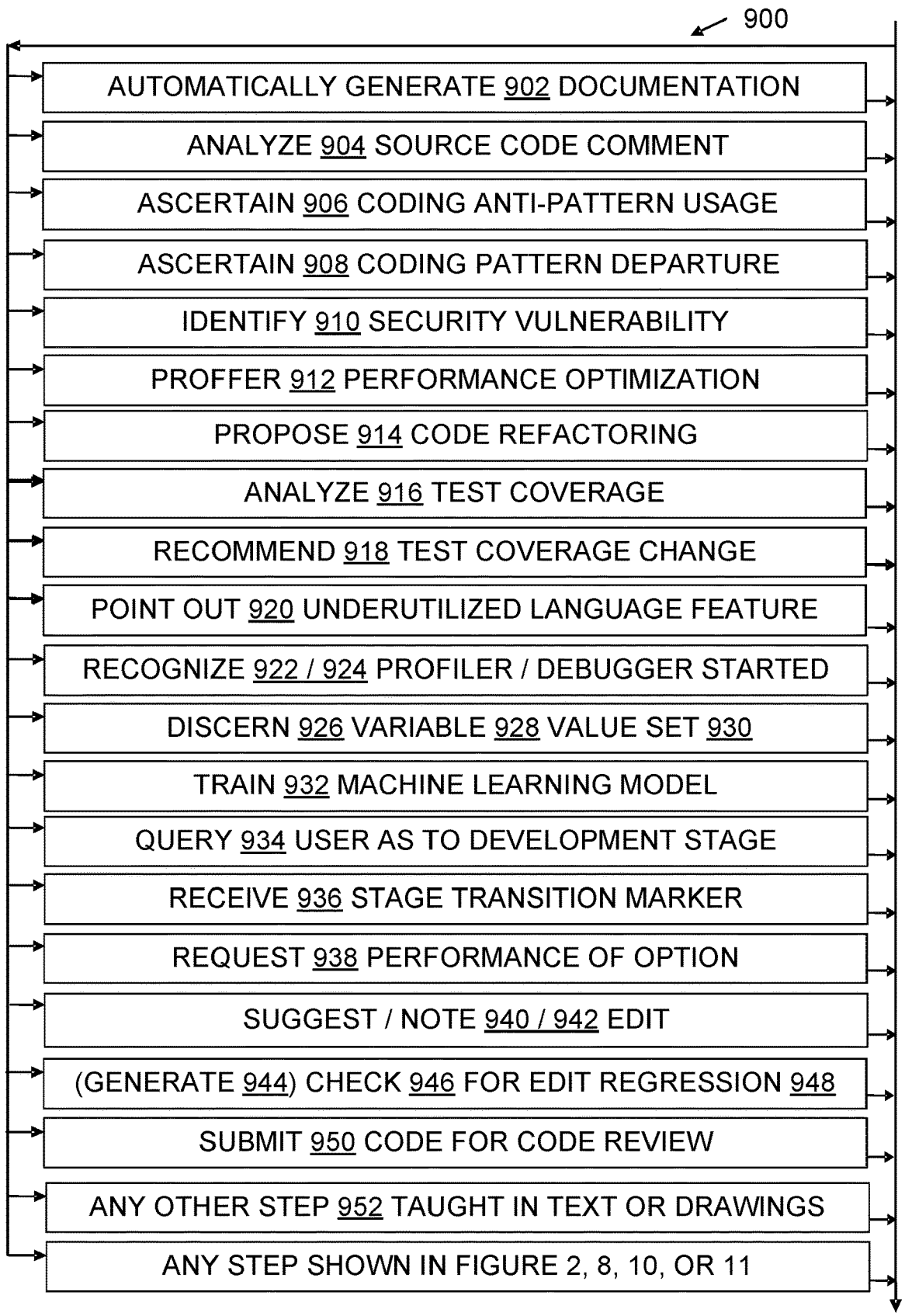
FIG. 9 is a second flowchart further illustrating steps in some improvement stage optimization methods, incorporating the steps shown in FIGS. 8 and 10.
Figure 10:
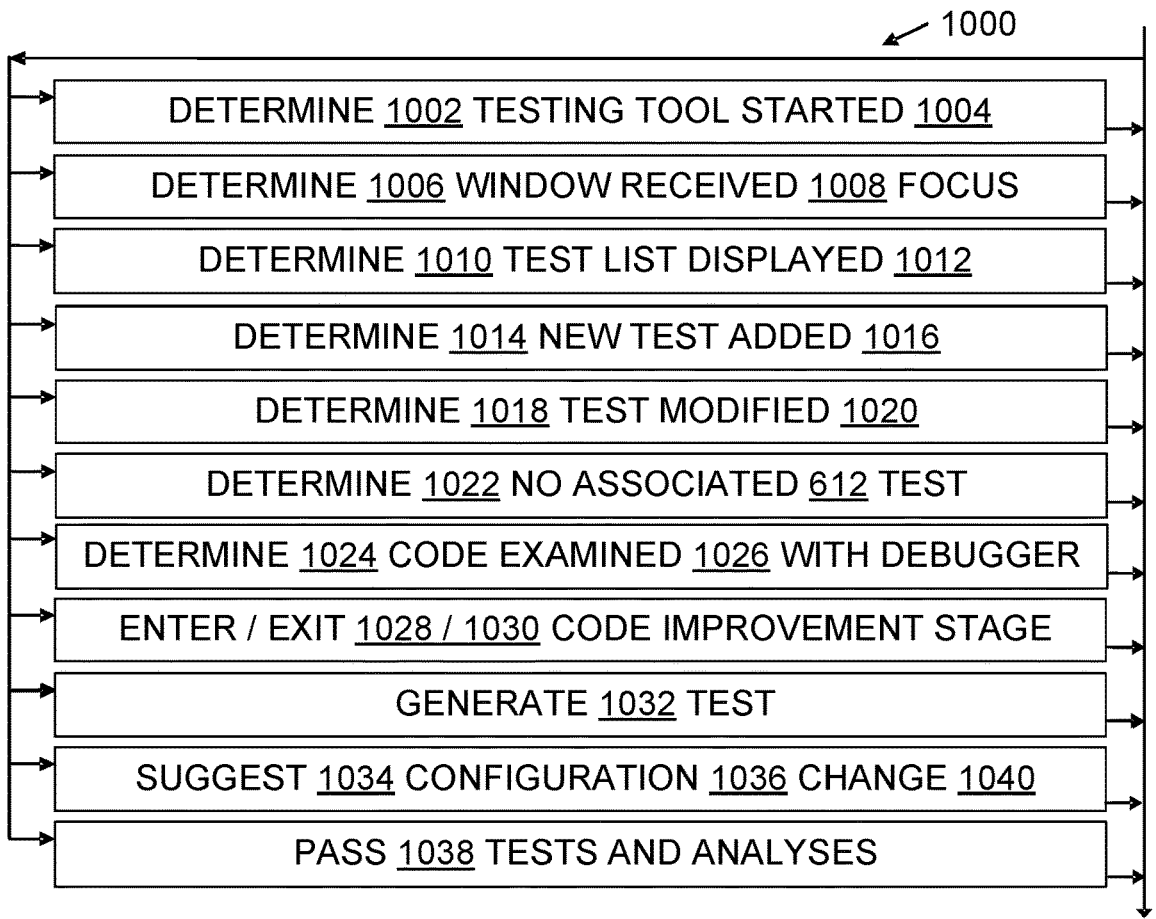
FIG. 10 is a third flowchart further illustrating steps in some improvement stage optimization methods.

Methods (which may also be referred to as "processes" in the legal sense of that word) are illustrated in various ways herein, both in text and in drawing figures. FIG. 8 illustrates a family of methods 800 that may be performed or assisted by an enhanced system, such as system 202 or another improvement stage optimization functionality enhanced system as taught herein. FIGS. 2 through 7 and 11 show an improvement stage optimization architecture with implicit or explicit actions, e.g., steps for collecting data, transferring data, storing data, and otherwise processing data. FIGS. 9 and 10 include some refinements, supplements, or contextual actions for steps illustrated by FIGS. 2, 8, and 11, and FIG. 9 incorporates the steps of FIGS. 2, 8, 10, and 11 as options.

Technical processes shown in the Figures or otherwise disclosed will be performed automatically, e.g., by an enhanced system 202, unless otherwise indicated. Related processes may also be performed in part automatically and in part manually to the extent action by a human person is implicated, e.g., in some embodiments a human 104 may type in a value for the system 202 to use as a response 214. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIGS. 8-10. Arrows in method or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 900 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments provide or utilize a method 900 for improvement stage code optimization, the method performed (executed) by a computing system, the method including: detecting 802 a code improvement stage during a software development activity which is directed at a particular program code; in response to detecting the code improvement stage, presenting 812 a code improvement option via a user interface, the code improvement option based on an artificial intelligence functionality which is configured to perform program code analysis 806; obtaining 814 a response to the presenting of the code improvement option; and implementing 816 the response.

In some situations, an AI-based functionality 210 runs and suggests an edit of the source code or a project configuration change, or recommends a change to testing. In some embodiments, the response 214 requests 938 performance of the code improvement option, and implementing 816 the response includes invoking 804 the artificial intelligence functionality to perform program code analysis 806 on at least a portion of the particular program code, and the method includes at least one of the following based on a result 306 of the program code analysis: suggesting 940 an edit 404 to a source code 314 of the particular program code; suggesting 1034 a configuration 1036 change 1040; or recommending 918 a change 542 in testing 412 associated with the particular program code.

In some situations, an AI-based functionality 210 runs and suggests an edit to the source code, and the source code is edited accordingly, and the tool 210 recommends changing the testing to avoid regressing 948 that edit. In some embodiments, the response 214 requests 938 performance of the code improvement option, and implementing 816 the response includes invoking 804 the artificial intelligence functionality to perform program code analysis 806 on at least a portion of the particular program code, and the method includes: noting 942 an edit 404 to a source code 314 of the particular program code, the edit based at least in part on a result 306 of the program code analysis; and recommending 918 a change 542 in testing 412 associated with the particular program code, the change in testing configured to check for regression 948 of the edit.

In some situations, an exit from code improvement stage is marked by passing all tests and analyses (AI-based or otherwise), a formal code review, a pull request, an integration of code to a source code version control server, or an integration of code to a higher branch in a branched version control structure. In some embodiments, the method 900 steps that are performed (e.g., steps 802 through 816 or a subset thereof which is performed) are fully performed prior to any of the following events 732 which mark an end of the code improvement stage 204: a pull request 736 to commit the particular program code to a repository 734; a passage 1038 of specified tests and specified analyses; a command 728 to a source code version control tool 726 to commit 406 the particular program code; a command 728 to a source code version control tool 726 to integrate 408 the particular program code; or a submission 950 of the particular program code to a code review queue 730.

In some situations, the start of code improvement stage 204 or the end of code improvement stage 204 is marked expressly by the developer. In some embodiments of the method 900, detecting 802 the code improvement stage includes receiving 936 a user input 720 which denotes a transition 718 from a code creation stage 402 or other stage 1104 to or from the code improvement stage 204. Some include receiving 936 a user input 720 which denotes a transition 718 between the code improvement stage 402 and another stage 1104.

In some embodiments, implementing 816 the response 214 includes modifying 404 at least a portion of the particular program code to conform with at least a portion of the code improvement option.

In some embodiments, the method includes invoking 804 the artificial intelligence functionality to perform program code analysis 806 in response to detecting 802 the code improvement stage by at least one of the following: determining 1002 that a testing tool 602 has been started 1004; determining 1006 that a testing window 610 has received 1008 a user interface focus 616; or determining 1010 that a list 604 of available tests 600 is being displayed 1012.

In some embodiments, the method includes invoking 804 the artificial intelligence functionality to perform program code analysis 806 in response to detecting 802 the code improvement stage by at least one of the following: determining 1014 that a new test 600, 606 has been added 1016; or determining 1018 that a test 600, 608 has been modified 1020.

In some embodiments, the method includes invoking 804 the artificial intelligence functionality to perform program code analysis 806 in response to detecting 802 the code improvement stage by recognizing 922 that a performance profiler 712 has been started 1004.

In some embodiments, the method includes invoking 804 the artificial intelligence functionality to perform program code analysis 806 in response to detecting 802 the code improvement stage by recognizing 924 that a debugger 708 has been started 1004 or by determining 1024 that the particular program code is being debugged 1026.

In some embodiments, the method includes invoking 804 at least one of the following artificial intelligence functionalities 210 in response to detecting 802 the code improvement stage: a trained machine learning model 502; a coding pattern detection module 510 or 516; a refactoring module 534; a testing coverage module 538; or a language feature utilization module 544.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as code improvement stage optimization software 302, AI-based functionalities 210 for code analysis 806, analysis results 306, a machine learning model 312 for improvement stage detection 802, events 732, and tests 600, in the form of data 118 and instructions 116, read from a removable storage medium 114 and/or another source such as a network connection, to form a configured storage medium. The configured storage medium 112 is capable of causing a computer system 102 to perform technical process steps for software development 308 improvement stage optimization 206, as disclosed herein. The Figures thus help illustrate configured storage media embodiments and process (a.k.a. method) embodiments, as well as system and process embodiments. In particular, any of the process steps illustrated in FIG. 2, 8, 9, 10, or 11, or otherwise taught herein, may be used to help configure a storage medium to form a configured storage medium embodiment.

Some embodiments use or provide a computer-readable storage device 112, 114 configured with data 118 and instructions 116 which upon execution by at least one processor 110 cause a computing system to perform a method 900 for improvement stage code optimization. This method includes: detecting 802 a code improvement stage during a software development activity which is directed at a particular program code; in response to detecting the code improvement stage, invoking 804 an artificial intelligence functionality on at least a portion of the particular program code, the artificial intelligence functionality configured to perform program code analysis 806; getting 808 a program code analysis result 306 from the artificial intelligence functionality; and presenting 812 a code improvement option 212 via a user interface 124, the code improvement option based on the program code analysis result.

More generally, some issues whose resolution may be optimized by identifying them during an improvement stage 204 include security issues and suggested fixes, production performance optimization issues and suggested fixes, and cases where code doesn't conform to common team patterns, e.g., "our team handles exceptions this way", that might crop up in code review. Catching these kinds of issues at test time 204 can help the developer by preventing the issues from arising at code review time, or even worse, being missed and causing trouble at runtime down the line with customers involved.

In some embodiments, the method 900 includes invoking 804 at least one of the following artificial intelligence functionalities 210: a trained machine learning model 502; a coding pattern detection module 510 or 516; a refactoring module 534; a testing coverage module 538; or a language feature utilization module 544.

In some embodiments, the method 900 includes modifying 404 at least a portion of the particular program code to conform with at least a portion of the code improvement option 212.

In some embodiments, the method 900 includes avoiding invoking 804 the artificial intelligence functionality 210 on the particular program code prior to detecting 802 the code improvement stage 204.

In some embodiments, detecting 802 the code improvement stage includes querying 934 a user as to a development status of the particular program code, and in response to the querying, receiving 936 a user input which denotes a transition to or from the code improvement stage.

Additional Observations

Additional support for the discussion of improvement stage code optimization functionality 208 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, examples and observations are offered herein.

Some embodiments provide or utilize systems, processes, or apparatus to perform identification and automatic fixing of issues with artificial intelligence at testing time 204 in an integrated development environment (IDE) 702. During the development of software in an IDE, developers will focus on different tasks at different times. Often, they will focus on writing 402 the program 130 first, then they will write tests 600, and finally they will run the tests to verify that the implementation 130 meets 1116 the expected behavior encoded in tests.

One insight that is taught and leveraged herein is that during the test execution period 204, development tools 310 have an opportunity to invoke 804 artificial intelligence (AI) capabilities 210 to find issues in the implementation 130 that aren't directly covered 540 by the battery of tests 600 that were implemented, and in at least some situations to immediately offer 812 automated mitigations 212 for the issues.

Thus, suitably enhanced tools 310 may present a user 104 with opportunities for improvement in their code 130 at a time when their mindset is that of performing fixes, instead of distracting the user earlier when they are focused on implementation details. This timing matters. Finding certain issues (e.g., issues with program performance 410, program behavioral accuracy 1116, program security 1124, or programming style 1118), and displaying potential fixes during program writing time, instead of following the present teachings, could be very distracting to the program writer.

In some embodiments, AI tools 210 that can be presented at testing time 204 in an IDE 702 are capable of finding 806 problems that would arise at runtime, such as security vulnerability issues 524, performance issues 410, code clarity issues 424, 426, 514, 520, and more. The tools 210 or their results 306, or both, may be offered 812, for example, when the program writer manipulates the IDE to have the IDE start 1004, 1008, 1012, 1016, or 1020 a testing session, e.g., by opening a view 610 into the tests 600 that the project has.

At this point, the view or another UI 124 may nudge the program writer 104 about additional available AI-powered analyzers 210 that they can choose to incorporate in their test battery 412. Once selected, the AI-powered tests 210 would run every time the test battery for the project is told to be executed. The results of both the regular tests 600 and the AI-powered tests 210 could be shown in a combined way. But the AI-powered tests could offer additional options to allow the program writer to automatically mitigate the issue with a single action in the IDE, allowing the user to review the changes before they are performed on the code files 130. Optionally, for some of the detected issues an embodiment will offer not just an automatic mitigation, but also offer to write 944 a regular test 600, 946 to ensure the change doesn't get regressed 948 in the future even if AI-powered tests are disabled. This workflow leverages a testing and fixing mindset which is present when the program writer initiates a testing session, and provides valuable analysis and solutions to common problems that the user might not have covered in their original effort.

Beneficially, offering the AI-powered analysis in response to detecting 802 code improvement stage entry helps maximize the usefulness of AI-powered analyzers by leveraging the mindset of the program writer, and by staying out of the developer's way when their mindset is not that of identifying issues and fixing them in their code. Without this attention to timing, AI-powered analyzers come at a cost of productivity due to their untimely appearance during the program writing time 402 when the program writer's mindset is set to a mode different than what the analyzers facilitate.

The present disclosure teaches specific use cases that are most fully exploited when the user has access to the code but is not actively writing a program, although the teachings are not limited to those specific use cases. For example, consider an AI-powered analyzer 210 that can read C# code 314 and create 902 code comments that describe what the methods do, or what a class does. Without the benefit of an embodiment, a program writer may well take time apart from the actual writing of the program 130 in order to fill in the comments 422. However, an AI-powered analyzer can do this work for them at the testing time, which is when they are working on improvements to the code and would welcome an AI-powered tool that did a piece of the documentation work for them.

Similarly, embodiments provide benefits in identifying and mitigating security issues in code 130. Consider an AI-powered analyzer 210 that is able to do a thorough analysis of the C++ code and the produced binaries and then display results identifying vulnerabilities 524 in the code as part of the testing phase in the IDE. The embodiment provides the program writer with a timely opportunity to address the security vulnerabilities before their code is pushed to the code server for code review, thus shifting-left the security verification process of complex applications.

Technical Character

The technical character of embodiments described herein will be apparent to one of ordinary skill in the art, and will also be apparent in several ways to a wide range of attentive readers. Some embodiments address technical activities such as analyzing 806 program code 130, executing a machine learning model 502, testing 412 software, and software development 308, which are each an activity deeply rooted in computing technology. Some of the technical mechanisms discussed include, e.g., improvement stage optimization software 302, machine learning models 502 and other artificial intelligence functionalities 210, and software development tools 310. Some of the technical effects discussed include, e.g., leveraging developer mindset by timing the presentation 812 of issue-spotting and mitigation options 212 to occur within a code improvement stage 204 of software development 308, detection of the code improvement stage 204 based on digital events 732, and more productive code reviews 414 due to resolving issues about program code performance 410, program code behavior accuracy 1116, program security 1124, or program code style 1118 prior to a review 414. Thus, purely mental processes and activities limited to pen-and-paper are clearly excluded. Other advantages based on the technical characteristics of the teachings will also be apparent to one of skill from the description provided.

Different embodiments may provide different technical benefits or other advantages in different circumstances, but one of skill informed by the teachings herein will acknowledge that particular technical advantages will likely follow from particular innovation features or feature combinations.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to detect code improvement stage 204 based on digital events 732, and which kinds of AI-based functionalities 210 to invoke during a code improvement stage 204 to maximize their effectiveness. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, peripherals, software process flows, identifiers, data structures, data selections, naming conventions, notations, control flows, or other embodiment implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
ID: identification or identity
LAN: local area network
MAC address: media access control address
OS: operating system
PaaS or PAAS: platform-as-a-service
RAM: random access memory
ROM: read only memory
SIEM: security information and event management, or tool for the same
TPU: tensor processing unit
UEFI: Unified Extensible Firmware Interface
UI: user interface
WAN: wide area network

Some Additional Terminology

Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"IoT" or "Internet of Things" means any networked collection of addressable embedded computing or data generation or actuator nodes. An individual node is referred to as an internet of things device 218 or IoT device 218. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Code improvement stage optimization operations such as invoking 804 an AI-based functionality 210, analyzing 806 a program 130 and formulating 810 improvement options, presenting 812 code improvement options 212, and many other operations discussed herein, are understood to be inherently digital. A human mind cannot interface directly with a CPU or other processor, or with RAM or other digital storage, to read and write the necessary data to perform the code improvement stage optimization steps 900 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac gadget" and that claim limitation became subject to means-plus-function interpretation, then at a minimum all structures identified anywhere in the specification in any figure block, paragraph, or example mentioning "zac gadget", or tied together by any reference numeral assigned to a zac gadget, or disclosed as having a functional relationship with the structure or operation of a zac gadget, would be deemed part of the structures identified in the application for zac gadget and would help define the set of equivalents for zac gadget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as analyzing, ascertaining, creating, detecting, determining, discerning, displaying, entering, exiting, formulating, generating, getting, identifying, implementing, invoking, obtaining, pointing out, presenting, proffering, proposing, querying, receiving, recognizing, recommending, requesting, starting, submitting, suggesting, training (and analyzes, analyzed, ascertains, ascertained, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102

101 machine in a system 102, e.g., any device having at least a processor 110 and a memory 112 and also having a distinct identifier such as an IP address or a MAC (media access control) address; may be a physical machine or be a virtual machine implemented on physical hardware 102 computer system, also referred to as a "computational system" or "computing system", and when in a network may be referred to as a "node"

104 users, e.g., user of an enhanced system 202, such as a developer or programmer; refers to a human or a human's online identity unless otherwise stated 106 peripheral device 108 network generally, including, e.g., LANs, WANs, software-defined networks, clouds, and other wired or wireless networks 110 processor; includes hardware 112 computer-readable storage medium, e.g., RAM, hard disks
114 removable configured computer-readable storage medium
116 instructions executable with processor; may be on removable storage media or in other memory (volatile or nonvolatile or both)
118 digital data in a system 102
120 kernel(s), e.g., operating system(s), BIOS, UEFI, device drivers
122 applications, e.g., version control systems, cybersecurity tools, software development tools, office productivity tools, social media tools, diagnostics, browsers, games, email and other communication tools, commands, and so on
124 user interface; hardware and software
126 display screens, also referred to as "displays"
128 computing hardware not otherwise associated with a reference number 106, 108, 110, 112, 114
130 program code of program under development, e.g., source code, object code, executable code, program resources such as images, and so on; may also be referred to as the program 130; project configuration or program configuration are treated as part of program code herein
132 program or software generally, e.g., applications 122, kernels 120, development tools 310
134 cloud, cloud computing environment
202 system 102 enhanced with improvement stage optimization functionality 208
204 improvement stage, as represented in a system 202, e.g., by specified events 732 or transition marker(s) 720; may also be referred to as testing time
206 optimization; may refer to an optimization of a program 130 or to an optimization of the benefits of invoking functionality 210, or both
208 functionality for improvement stage optimization; e.g., software or specialized hardware which performs or is configured to perform at least steps 802, 804, and 812, or any software or hardware which performs or is configured to perform a method 900 or a computational improvement stage optimization activity first disclosed herein
210 AI-based code improvement functionality; computational; may also be referred to as AI tool or AI analyzer
212 code improvement option as represented in a system 202, e.g., a possible source code edit or testing coverage change; digital
214 response to presentation of an option 212, e.g., "yes", "no", or a different source code edit or testing coverage change or configuration change than the one presented; computational
302 improvement stage optimization software, e.g., software which upon execution performs at least steps 802, 804, 812, and 814
304 AI-based analysis of at least part of a program 130, e.g., any analysis performed by functionality identified in FIG. 5; computational
306 a result of an analysis 304, e.g., identification of an issue; may also include one or more possible mitigations to resolve the issue; digital
308 software development, as represented or performed in a system 202
310 software development tool, e.g., any tool 122 utilized in any of the stages 1104 shown in FIG. 11, or any tool 122 identified in FIG. 7; may be enhanced with functionality 208
312 trained machine learning model configured to detect entry 1028 into an improvement stage; computational
314 source code; digital
316 interface generally
402 code creation stage of software development, as represented in a system 202, e.g., by specified events 732 or transition marker(s) 720
404 edit, e.g., a change in source code; may also refer to the action of editing a program 130; computational activity or digital value or both
406 commit; computational activity of committing changes in a source code version control system; may also refer to a digital representation of a result of the computational activity
408 integration; computational activity of integrating code in a source code version control system or other tool 310 that accepts code from multiple developers or tracks code versions or both; may also refer to a digital representation of a result of the computational activity
410 computational performance of a program, e.g., processor cycles used, memory used, bandwidth used, latency, speed, power consumption, and so on
412 testing tools, testing suite, or computational activity of testing behavior of a program
414 review of a program, e.g., as performed by human personnel to assess characteristics and quality of the program
416 release of a program from one phase or stage to the next during software development, as represented in a system 202, e.g., by specified events 732 or transition marker(s) 720
418 program debugging; computational activity of executing or modifying or displaying code in a debugger
420 development team, e.g., human personnel who write or test or review a program 130 in coordination with one another
422 comment in source code; digital; may also be referred to as remarks in source code
424 comment clarity, as assessed and represented by a tool 210
426 comment accuracy, as assessed and represented by a tool 210
428 change generally, as represented in a system 202
430 message generated by a tool 310 or 210; digital
502 trained machine learning model; computational
504 AI-based documentation generation functionality; computational
506 program documentation; digital
508 AI-based comment analysis functionality; computational
510 AI-based coding anti-pattern detection functionality; computational
512 coding anti-pattern, as represented in a system 202
514 usage of a coding anti-pattern, as represented in a system 202
516 AI-based coding pattern departure detection functionality;
computational
518 coding pattern, as represented in a system 202; whereas use of anti-patterns is best avoided, use of patterns is preferred
520 departure from pattern use, e.g., use of code that does not match a pattern 518 in a location where code matching the pattern could have been used instead
522 AI-based functionality to identify a security vulnerability 524; computational 524 security vulnerability, as represented in a program 130
526 AI-based functionality to proffer a performance 410 optimization; computational
528 performance 410 optimization, e.g., reduction in use of computational resources without sacrificing program features 1108 or failing tests 600 that were passed before the optimization
530 AI-based linting functionality; computational
532 tinting; computational activity of identifying programming errors, bugs, stylistic errors, or suspicious constructs in a program 130
534 AI-based functionality to recommend or perform source code refactoring; computational
536 source code refactoring as represented in a system 202; may refer to computational activity or to a result of the computational activity
538 AI-based functionality to assess testing coverage 540; computational
540 extent or type of coverage of a program 130 by testing 412, as represented in a system 202
542 change in testing coverage as represented in a system 202; e.g., a change in which code is tested or what the code is tested for, or both
544 AI-based functionality to assess programming language feature utilization in a program 130; computational
546 programming language feature, especially one that could have been utilized more than it was in a given version of a program 130
548 AI-based functionality which includes more than a machine learning model 502; may also include a model 502 but need not; computational
600 test as represented in a system 202; computational or digital or both
602 testing tool; computational
604 list of tests 600; digital
606 relatively new test 600, e.g., a test 600 added after the most recent previous display of tests
608 modified test 600
610 testing window, e.g., interface 124 providing information about tests 600 or access to testing 412 or both
612 association between a test 600 and a code portion 614, as represented in a system 202, e.g. in a data structure or implicitly in an algorithm
614 portion of a program 130; digital; unless otherwise indicated, an activity involving a program 130 need not involve the entire program but does involve at least a portion of the program
616 focus of user interface, e.g., the window, command interpreter, application, or other GUI item which will receive the next user input
702 integrated development environment; computational; a tool 310
704 source code editor computational; a tool 310
706 compiler; computational; a tool 310
708 debugger; computational; a tool 310
710 digital value in a debugger
712 performance profiler; computational; a tool 310
714 programming language, as represented in a system 202
716 programming language 714 feature, e.g., construct or capability
718 transition between stages 1104 or into or out of a particular stage 1104, as represented in a system 202
720 digital event or input or other value representing a transition 718
722 source code version, e.g., as represented in a system 202 or a version control tool 726
724 source code version control, e.g., tracking who has a version checked out or which version is being checked in or what differences are between versions; e.g., as represented in a system 202 or a version control tool 726
726 source code version control tool; computational; a tool 310
728 command as represented in a system 202
730 code review queue, e.g., list of code awaiting review 414; digital
732 digital representation of an event in a system 202
734 code repository; computational; a tool 310
736 repository pull request; e.g., as represented in a system 202 or a repository tool 734
738 tool 310 pipeline; may also be called a "tool chain"; a sequence or other progression of tools 310 arranged to provide output from one tool as input to another tool; e.g., a web-based pipeline for running tests
800 flowchart; 800 also refers to improvement stage optimization methods that are illustrated by or consistent with the FIG. 8 flowchart
802 computationally detect entry into an improvement stage during software development
804 computationally invoke an AI-based functionality 210, e.g., via an API
806 computationally analyze at least part 614 of a program 130, e.g., by execution of a model 502, 210 or a module 548, 210
808 computationally get an analysis result, e.g., via an API
810 computationally form (a.k.a. formulate) a code improvement option; may be part of analysis 806 or overlap analysis 806
812 computationally present a code improvement option, e.g., via a tool 310 user interface 124; may also be referred to as offering, suggesting, recommending, proffering, proposing, etc.
814 computationally obtain a user input representing a response 214 to a presented code improvement option, e.g., via a tool 310 user interface 124
816 computationally implement a response 214
900 flowchart; 900 also refers to improvement stage optimization methods that are illustrated by or consistent with the FIG. 9 flowchart, which incorporates the steps of FIGS. 2, 8, 10, and 11
902 computationally generate comments or other documentation
904 computationally analyze source code, e.g., using functionality 210
906 computationally ascertain usage of an anti-pattern, e.g., using functionality 210
908 computationally ascertain departure from a coding pattern, e.g., using functionality 210
910 computationally identify a security vulnerability in code, e.g., using functionality 210
912 computationally proffer a performance optimization, e.g., using an interface 124 and functionality 210
914 computationally propose a code refactoring, e.g., using an interface 124 and functionality 210
916 computationally analyze test coverage, e.g., using functionality 210
918 computationally recommend a test coverage change, e.g., using an interface 124 and functionality 210

920 computationally point out an underutilized language feature, e.g., using an interface 124 and functionality 210

922 computationally recognize that a profiler started running or has the focus 616, e.g., based on an event 732

924 computationally recognize that a debugger started running or has the focus 616, e.g., based on an event 732

926 computationally discern that a variable has been given 930 a value via a debugger interface, e.g., based on an event 732 or API 928 variable in a program 130; digital 930 computationally assign a digital value to a variable 932 computationally train a machine learning model 502

934 computationally query a user, e.g., "would you like to do some debugging or testing now?"; e.g., via user interface 936 computationally receive input as a transition marker, e.g., via user interface; e.g., an express user command to display available performance analyzers 210

938 computationally request performance of an option 212, e.g., via an API 940 computationally suggest an edit be done, e.g., via an API 942 computationally note an edit has been done, e.g., via an API 944 computationally generate a test 600 to see if a suggested edit or other change has been undone 948

946 computationally test (a.k.a. check) to see if a suggested edit or other change has been undone 948; 946 also refers to such as test 600

948 regression (undoing) of a change 950 computationally submit code 130 for review, e.g., by adding an identification of the code to a review queue 730

952 any step discussed in the present disclosure that has not been assigned some other reference numeral; 952 may thus be shown expressly as a reference numeral for various steps, and may be added as a reference numeral for various steps without thereby adding new matter to the present disclosure 1000 flowchart; 1000 also refers to improvement stage optimization methods that are illustrated by or consistent with the FIG. 10 flowchart 1002 computationally determine that a testing tool has been launched, revived from suspension, or otherwise placed in condition to receive input and execute on that input, e.g., per an event 732

1004 computationally start a program, e.g., by launching it or reviving it 1006 computationally determine that a window has received the UI focus 616, e.g., per an event 732

1008 computationally receive the UI focus 616

1010 computationally determine that a list of tests 600 is being displayed, e.g., per an event 732

1012 computationally display a list of tests 600, e.g., in a UI 124

1014 computationally determine that test 600, 606 has been added, e.g., per an event 732

1016 computationally add a test 600, 606, e.g., to a testing suite 1018 computationally determine that test 600, 608 has been modified, e.g., per an event 732

1020 computationally modify a test 600, 608

1022 computationally determine that no test 600 is associated with part 614 of a program 130, e.g., via a coverage 540 data structure 1024 computationally determine that code 130 is being examined in a debugger e.g., per an event 732 or API 1026 computationally examine code in a debugger, e.g., by loading the code into the debugger, running the code in the debugger, or displaying the code in the debugger 1028 computationally enter a code improvement stage, e.g., per a detection 802

1030 computationally exit a code improvement stage, e.g., by transition to a different stage 1104 or by terminating program development 1032 computationally generate a test 600

1034 computationally suggest a change to a configuration 1036

1036 configuration as represented in a system 102, e.g., a program configuration, build configuration, or programming project configuration; digital 1038 computationally pass a set of one or more specified tests 600 or one or more specified analyses 304 or both; may also be referred to as passage 1038 as represented digitally in a system 102

1040 change in a configuration 1036; digital

1100: diagram representing a segment (portion) a software lifecycle 1102 software developer priority or other goal; also refers to activity of prioritizing, as implicitly or explicitly represented in a system 102

1104 stage of software lifecycle; stages shown in FIG. 11 are examples; stages may also be referred to as phases, steps, milestones, periods, chapters, etc.

1106 software lifecycle design stage 1108 software features, e.g., main capabilities or purposes to meet 1110 program user experience while using software 1112 algorithm, as represented in software; computational 1114 data structure in software; digital 1116 behavioral accuracy of program when it executes; bugs and not-yet-implemented capabilities are examples of inaccuracies 1118 program code style, e.g., use of white space, adherence to identifier naming conventions, patterns or anti-patterns used, language features utilized, comments, readability and clarity to other developers, and so on 1120 software lifecycle deployment stage 1122 availability of software to people other than the developer 1124 program security, e.g., the confidentiality, availability, integrity, or privacy of data which is in the program or is accessible using the program

CONCLUSION

In short, the teachings herein provide a variety of improvement stage optimization functionalities 208 which operate in enhanced systems 202. Some embodiments automatically detect 802 a software development 308 code improvement stage 204. Improvement stage detection 802 may be based on computational events 732 involving a development tool 310, such as a testing tool 602, a debugger 708, or a performance profiler 712. Program analysis 806 tools 310 driven by artificial intelligence functionality 210 may then be automatically invoked 804 to provide 808, 810 code improvement options 212, which may be presented 812 to a developer in a tool 310 user interface 124. Options 212 may include source code 314 edits 404, configuration 1036 changes 1040, or test coverage 540 changes 542, for example. Analysis results 306 and corresponding code improvement options 212 are thus presented 812 when the developer is prioritizing 1102 program performance 410, program behavior accuracy 1116, program security 1124, or programming style 1118, as opposed to prioritizing code creation 402 or code integration 408. Programs 130 under development 308, as well as quality reviews 414 of such programs 130, may accordingly be optimized 206 by performing performance 410 analysis 304, testing 412, 304, security 1124 analysis 304, and coding style 1118 analysis 304 during the code improvement stage 204.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A method for improvement stage code optimization, the method performed by a computing system, the method comprising:
   based on at least one event, detecting an entry into a code improvement stage during a software development activity which is directed at a particular program code, the code improvement stage distinguished in the computing system from at least a code design stage or a code deployment stage, wherein detecting the entry into the code improvement stage comprises at least one of:
   determining that a testing tool has been started,
   determining that a testing window has received a user interface focus,
   determining that a list of available tests is being displayed,
   determining that a transition marker has been provided, the transition marker distinguishing the code improvement stage in the computing system from at least a code design stage or a code deployment stage,
   determining that a new test has been added,
   determining that a test has been modified,
   recognizing that a debugger has been started,
   determining that the particular program code is being debugged,
   determining that no tests are associated with the particular program code and determining the particular program code is being examined with a debugger,
   determining that no tests are associated with a portion of the particular program code which is being examined with a debugger,
   discerning that a variable value has been set per a user input value during debugging, or recognizing that a performance profiler has been started;
   in response to detecting the entry into the code improvement stage, invoking an artificial intelligence functionality to perform a program code analysis, and presenting a code improvement option via a user interface, the code improvement option based at least in part on a result of the artificial intelligence functionality performance of the program code analysis;
   obtaining a response to the presenting of the code improvement option;
   implementing the response; and
   detecting an end of the code improvement stage, wherein detecting the end of the code improvement stage comprises detecting at least one of:
   a pull request to commit the particular program code to a repository,
   a passage of specified tests and specified analyses,
   receipt of a transition marker, the transition marker distinguishing the code improvement stage in the computing system from at least a code design stage or a code deployment stage,
   a command to a source code version control tool to commit the particular program code,
   a command to a source code version control tool to integrate the particular program code, or
   a submission of the particular program code to a code review queue.

2. The method of claim 1, wherein the response requests performance of the code improvement option, and the method further comprises at least one of the following based on a result of the program code analysis:
   suggesting an edit to a source code of the particular program code;
   suggesting a configuration change; or
   recommending a change in testing associated with the particular program code.

3. The method of claim 1, wherein the response requests performance of the code improvement option, and the method further comprises:
   noting an edit to a source code of the particular program code, the edit based at least in part on a result of the program code analysis; and
   recommending a change in testing associated with the particular program code, the change in testing configured to check for regression of the edit.

4. The method of claim 1, wherein detecting the entry into the code improvement stage and presenting the code improvement option are performed at least in part prior to detecting the end of the code improvement stage.

5. The method of claim 1, wherein detecting the entry into the code improvement stage includes receiving a user input which denotes a transition between the code improvement stage and another stage.

6. The method of claim 1, wherein implementing the response includes modifying at least a portion of the particular program code to conform with at least a portion of the code improvement option.

7. The method of claim 1, comprising invoking the artificial intelligence functionality to perform program code analysis in response to detecting the entry into the code improvement stage by at least one of the following:
  determining that a testing tool has been started;
  determining that a testing window has received a user interface focus; or
  determining that a list of available tests is being displayed.

8. The method of claim 1, comprising invoking the artificial intelligence functionality to perform program code analysis in response to detecting the entry into the code improvement stage by at least one of the following:
  determining that a new test has been added; or
  determining that a test has been modified.

9. The method of claim 1, comprising invoking the artificial intelligence functionality to perform program code analysis in response to detecting the entry into the code improvement stage by recognizing that a performance profiler has been started.

10. The method of claim 1, comprising invoking the artificial intelligence functionality to perform program code analysis in response to detecting the entry into the code improvement stage by recognizing that a debugger has been started or by determining that the particular program code is being debugged.

11. The method of claim 1, comprising invoking at least one of the following artificial intelligence functionalities in response to detecting the entry into the code improvement stage:
  a trained machine learning model;
  a coding pattern detection module;
  a refactoring module;
  a testing coverage module; or
  a language feature utilization module.

12. A computing system which is configured to facilitate source code development, the system comprising:
  a digital memory;
  a software development tool having a user interface; and
  a processor in operable communication with the digital memory, the processor configured to perform improvement stage code optimization including:
  (a) based on at least one event, detecting an entry into a code improvement stage during a software development activity which is directed at a particular program code, or detecting an end of the code improvement stage after a previously detected entry into the code improvement stage, or both, wherein the code improvement stage distinguished in the computing system from at least a code design stage or a code deployment stage,
  (b) in response to detecting the entry into the code improvement stage, invoking an artificial intelligence functionality to perform a program code analysis, and presenting a code improvement option via the user interface, the code improvement option based at least in part on a result of the artificial intelligence functionality performance of the program code analysis,
  obtaining a response to the presenting of the code improvement option, and
  implementing the response;
wherein the system is configured to detect the entry into the code improvement stage by at least one of:
  determining that a testing tool has been started,
  determining that a testing window has received a user interface focus,
  determining that a list of available tests is being displayed,
  determining that a transition marker has been provided, the transition marker distinguishing the code improvement stage in the computing system from at least a code design stage or a code deployment stage,
  determining that a new test has been added,
  determining that a test has been modified,
  recognizing that a debugger has been started,
  determining that the particular program code is being debugged,
  determining that no tests are associated with the particular program code and determining the particular program code is being examined with a debugger,
  determining that no tests are associated with a portion of the particular program code which is being examined with a debugger,
  discerning that a variable value has been set per a user input value during debugging, or
  recognizing that a performance profiler has been started; and
wherein the system is also configured to detect an end of the code improvement stage as being marked by at least one of:
  a pull request to commit the particular program code to a repository,
  a passage of specified tests and specified analyses,
  receipt of a transition marker, the transition marker distinguishing the code improvement stage in the computing system from at least a code design stage or a code deployment stage,
  a command to a source code version control tool to commit the particular program code,
  a command to a source code version control tool to integrate the particular program code, or
  a submission of the particular program code to a code review queue.

13. The system of claim 12, further comprising at least one of the following artificial intelligence functionalities:
  a trained machine learning model or AI-based module which is configured to perform program source code analysis and automatically generate documentation which describes a code behavior;
  a trained machine learning model or AI-based module which is configured to perform program source code comment analysis as to comment clarity or comment accuracy or both;
  a coding pattern detection module or trained machine learning model which is configured to perform program source code analysis and automatically ascertain usage of a coding anti-pattern;
  a coding pattern detection module or trained machine learning model which is configured to perform program source code analysis and automatically ascertain departure from a specified coding pattern;
  a trained machine learning model or AI-based module which is configured to perform program source code analysis and automatically identify a security vulnerability;
  a trained machine learning model or AI-based module which is configured to perform program source code analysis and automatically proffer a performance optimization;
  a trained machine learning model or AI-based module which is configured to perform program source code linting analysis;
  a refactoring module or trained machine learning model which is configured to perform program source code analysis and automatically propose a code refactoring;
  a testing coverage module or trained machine learning model which is configured to perform testing coverage analysis and automatically recommend a change in testing coverage; or a language feature utilization module or trained machine learning model which is configured to perform program source code analysis and automatically point out programming language features which were not utilized or otherwise underutilized.

14. The system of claim 13, wherein the system comprises at least three of the artificial intelligence functionalities.

15. The system of claim 12, further comprising a machine learning model trained to perform code improvement stage detection.

16. A computer-readable storage device configured with data and instructions which upon execution by a processor cause a computing system to perform a method for improvement stage code optimization, the method comprising:

based on at least one event, detecting an entry into a code improvement stage during a software development activity which is directed at a particular program code, the code improvement stage distinguished in the computing system from at least a code design stage or a code deployment stage, wherein detecting the entry into the code improvement stage comprises at least one of:
    determining that a testing tool has been started,
    determining that a testing window has received a user interface focus,
    determining that a list of available tests is being displayed,
    determining that a transition marker has been provided, the transition marker distinguishing the code improvement stage in the computing system from at least a code design stage or a code deployment stage,
    determining that a new test has been added,
    determining that a test has been modified,
    recognizing that a debugger has been started,
    determining that the particular program code is being debugged,
    determining that no tests are associated with the particular program code and determining the particular program code is being examined with a debugger,
    determining that no tests are associated with a portion of the particular program code which is being examined with a debugger,
    discerning that a variable value has been set per a user input value during debugging, or recognizing that a performance profiler has been started;
  in response to detecting the entry into the code improvement stage, invoking an artificial intelligence functionality on at least a portion of the particular program code, the artificial intelligence functionality configured to perform program code analysis;
  getting a program code analysis result from the artificial intelligence functionality;
presenting a code improvement option via a user interface, the code improvement option based on the program code analysis result; and
  detecting an end of the code improvement stage;
wherein the artificial intelligence functionality comprises at least one of:
  a trained machine learning model or AI-based module which is configured to perform program source code comment analysis as to comment clarity or comment accuracy or both,
  a coding pattern detection module or trained machine learning model which is configured to perform program source code analysis and automatically ascertain usage of a coding anti-pattern,
  a coding pattern detection module or trained machine learning model which is configured to perform program source code analysis and automatically ascertain departure from a specified coding pattern,
  a trained machine learning model or AI-based module which is configured to perform program source code analysis and automatically proffer a performance optimization,
  a refactoring module or trained machine learning model which is configured to perform program source code analysis and automatically propose a code refactoring, or
  a language feature utilization module or trained machine learning model which is configured to perform program source code analysis and automatically point out programming language features which were not utilized or otherwise underutilized.

17. The computer-readable storage device of claim 16, wherein the invoking invokes at least one of the following artificial intelligence functionalities:
  a trained machine learning model;
  a coding pattern detection module;
  a refactoring module;
  a testing coverage module; or
  a language feature utilization module.

18. The computer-readable storage device of claim 16, wherein the method further comprises modifying at least a portion of the particular program code to conform with at least a portion of the code improvement option.

19. The computer-readable storage device of claim 16, wherein the method further comprises avoiding invoking the artificial intelligence functionality on the particular program code prior to detecting the entry into the code improvement stage.

20. The computer-readable storage device of claim 16, wherein detecting the entry into the code improvement stage includes querying a user as to a development status of the particular program code, and in response to the querying, receiving a user input which denotes a transition from a code creation stage to the code improvement stage.

* * * * *